Figure 1:
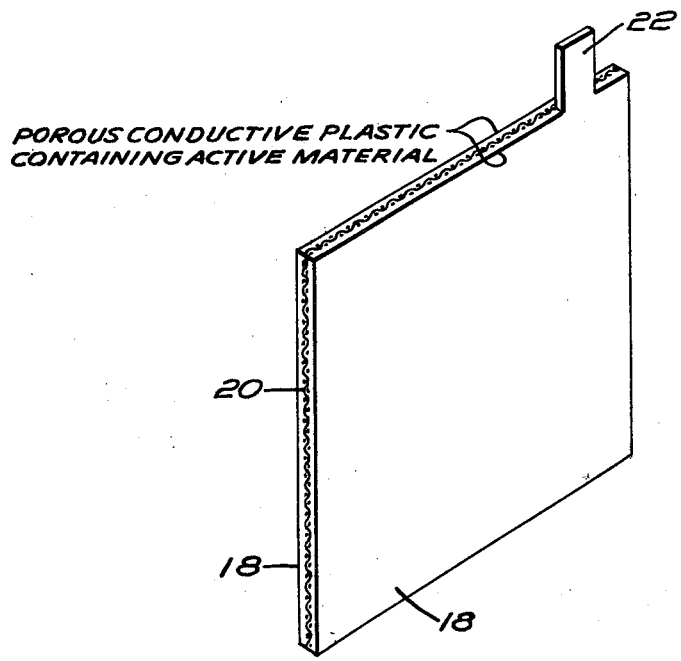

May 18, 1965  G. B. ELLIS  3,184,339

BATTERY ELECTRODE

Filed April 10, 1962

INVENTOR:
GRENVILLE B. ELLIS
BY:
Beau, Brooks, Buckley & Beau,
ATTORNEYS.

United States Patent Office 3,184,339
Patented May 18, 1965

3,184,339
BATTERY ELECTRODE
Grenville B. Ellis, 225 Main St., Easthampton, Mass.
Filed Apr. 10, 1962, Ser. No. 188,606
3 Claims. (Cl. 136—75)

This application is a continuation-in-part of my applications Serial No. 588,707, filed June 1, 1956, and Serial No. 831,776 filed August 5, 1959.

The present invention relates generally to electric batteries or voltaic cells and more particularly to a novel and improved electrode for use therein. The invention has particular utility in connection with storage batteries of the alkaline cell type, although it is not limited to such use.

It is well-known that electrodes for batteries are fabricated commercially in a wide variety of shapes and forms, depending upon the characteristics of the particular type of cell and active materials used, and also dependent upon the size of the battery and its proposed use and conditions of operation. Where the active material of the electrode has sufficient mechanical strength to be self-supporting and has sufficient conductivity, it is possible to form the electrode throughout of the active material per se which is advantageous from the standpoint of cheapness of fabrication and the case of forming a variety of shapes, such as plates, cylinders, cups, etc. The disadvantages are that the active material may be expensive or in such scarce supply that it is unavailable for use in large quantities for this purpose. Where the active material does not have sufficient mechanical strength to be supporting or lacks good conductivity, various techniques have been employed to form a composite electrode structure. For example, the active material may be formed chemically or electrochemically on the surface of a plate, etc., composed of a material which can be converted into the active material. Another expedient has been to form plates, grids, perforated boxes or tubes, pocketed supporting members and the like on or in which the active material is pasted or contained. Another expedient, notably in the manufacture of the alkaline cell type of battery, is to form a sintered plate or plaque for impregnation by the active material. All of these last named expedients are difficult and expensive to fabricate and assemble because of the necessity of using materials which are non-reactive or compatible in contact with the electrolyte and the active material, the requirement of low resistivity to permit leading off of the electric current with a minimum of loss, the requirement that the electrolyte have ready access to the active ingredients, and the requirement for ability to withstand shock and rough treatment and the need for compactness.

Figure 2:
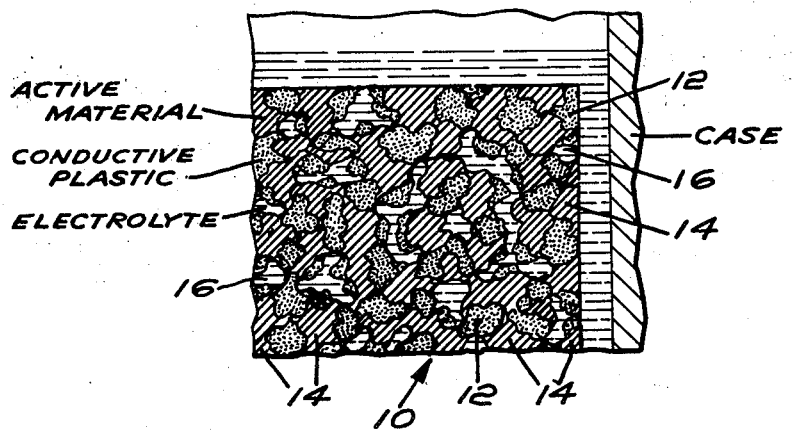

In accordance with the present invention, all these requirements are met with a minimum use of active material in combination with inexpensive and readily available materials in a simple and convenient manner. In the practice of the present invention, it is possible to form the electrode in a variety of shapes and forms and there is realized a considerable saving in cost, both from the standpoint of the materials used and also from the standpoint of the techniques of manufacture and fabrication. Other objects and advantages of the invention will appear from the specification hereinafter, and the drawing herewith which illustrates examples of constructions of the invention, wherein:

FIG. 1 is a perspective view illustrating an exemplary electrode in plate form for use in a battery and formed in accordance with the present invention; and FIG. 2 is a fragmentary microscopic sectional view thereof, shown as being installed in a battery case with electrolyte.

In accordance with the present invention, the active material of the electrode is carried primarily by a porous cage formed of electrically conductive plastic. The term "plastic" is used herein to denote the group of materials commercially referred to as plastics and resins which are principally organic substances, mostly synthetic or semi-synthetic condensation or polymerization products which can be shaped or cast under heat and pressure. These materials which are readily available commercially are generally inert or resistant to chemical reaction and normally have good strength characteristics so that they can withstand rough physical treatment. Inasmuch as the plastic for use in the present invention must be porous, the preferred plastics known at the present time for use in the present invention are polystyrene, cellulose acetate, polyvinyl butyrate, styrene-butadiene copolymers, styrene-butadiene-acrylonitrile resins, ethyl cellulose, polyvinyl alcohol, epoxy resins, melamine-formaldehyde, polyamides (nylon), vinyl butyral, polyvinyl formal, polyethylene, polyhalogenated ethylenes and methacrylate resins.

While it is within the contemplation of the invention that it may be possible to utilize a porous plastic which is rendered conductive per se, such as by chemical modification of the molecular structure of the plastic, such materials are generally lacking in good conductivity and therefore it is preferred for the purpose of the present invention to utilize a porous plastic which has been rendered conductive by the presence therein of finely divided conductive material, such as carbon or metallic particles, or both. Carbon particles are generally suitable for most battery electrode uses because of the inertness of the carbon and its compatibility with most electrolytes and active materials. When a plastic containing metal particles is selected it is desirable, of course, to select a metal which is compatible and nonreactive with the electrolyte and the active material of the electrode. For example, in a nickel cadmium battery the metal particles could selectively be nickel particles. While various conductive plastics of the type just described are available, it has been found that a preferred conductive plastic is one made in accordance with the disclosure of the Coler Patent No. 2,683,669 dated July 13, 1954, and as sold under the trademark "Markite."

In the formation of a battery electrode in accordance with the invention, the active material to be carried by the porous conductive plastic may be added to the plastic material before the plastic material is molded into the shape to be used in the electrode. The active material is preferably added in the form of the final compounds required as the active material, so that no subsequent chemical forming treatment is required.

In the event the porous plastic selected has sufficient conductivity and structural strength, and particularly where size and compactness is a factor, it may be preferred to form the electrode without any supporting structure other than the plastic itself. On the other hand, it is an advantage of the invention that the plastic may be applied, if desired, to a supporting grid or other base such as a metal mesh or wire screen, etc. This is particularly advantageous in the case of electrodes of large size and where high discharge rates are contemplated. It will be realized that since the plastics contemplated by the present invention can be molded in a wide variety of shapes and sizes, considerable freedom is provided for the use of a variety of designs of electrodes.

In order that the invention may be fully understood, the following specific examples of the formation of a battery electrode in accordance with the invention for use in a nickel-cadmium battery and as illustrated in the accompanying drawing are given.

Example I

Nodules are pellets of conductive plastic are first obtained for example by using a molding powder formed of polystyrene coated with acetylene black in accordance with the method disclosed in the Coler Patent No. 2,683,669 mentionel above. This plastic material in granular form is then homogeneously mixed with the active material being also employed at this stage in pelletized or other granular form. For the positive electrode the active material will of course comprise a suitable nickel hydrate cmpound, previously prepared by any appropriate and well known steps in the art; the material being used at this stage in the form of the final compounds required as the active material, so that no subsequent chemical "forming" treatment is required.

The granular plastic and active materials are mixed in the proportion of 20% plastic and 80% active material and then fabricated into plate or sheet form by molding the mixture at a temperature of about 450° F. and a pressure of about 200 p.s.i. so as to cause the plastic components to weld together at different points throughout the mass, thereby interlocking the structure while at the same time avoiding compaction of the mass such as would render it non-porous. Thus as shown for example in FIG. 2, an electrode may be constructed as shown generally at 10 to comprise a matrix of conductive plastic granules as indicated at 12 some of which are heterogeneously welded together at various points of contact throughout the mass to provide an integrated plate-like structure. The entrapped active material granules are illustrated at 14, and the open spaces throughout the mass are illustrated at 16; it being understood that these spaces are heterogeneously interconnecting, thereby rendering the plate highly porous and open to circulation of electrolyte throughout as indicated by the drawing.

Example II

Particulate conductive polystyrene, as in Example I, is mixed in the proportion of 10% plastic to 90% cadmium nitrate and/or cadmium oxide. This mixture is then wetted with sufficient of a suitable solvent, methyl ethyl ketone, to render the conductive plastic particles "tacky" without destroying or materially altering the geometric integrity of such particles. The mixture is then subjected to a molding pressure of about 500 p.s.i., and then dried.

Example III

The method of Example I is followed except that 5% plastic and 95% active material is used, the active material being cadmium nitrate and/or cadmium oxide.

In general, positive plates utilize a greater proportion of plastic than do negative plates. Thus, whereas the method according to Example I is specifically intended for making positive plates, the methods of Examples II and III are specifically intended for making negative plates. Additionally, whereas the aforementioned Coler Patent No. 2,683,669 specifies a range of 0.1 to 25% of carbon to plastic, and a preferred range of from 1% to 15% carbon to plastic, by weight, it is preferred herein to utilize a proportion of carbon at about the upper limit of the stated preferred range, that is, 15% carbon. In other words, it is preferred that the plastic exhibit a substantial degree of conductivity.

Thus it will be appreciated that by virtue of this construction an electrode is obtained by a method allowing full control of the porosity of the finished plate, whereby to obtain optimum electrolyte circulation throughout the entire electrode structure. At the same time the active material is effectively entrapped and held therein by means of a "cage" of plastic, the internal configurations of which are so tortuous as to effect an improved retention of the active material within the confines of the plate structure. Furthermore, this "cage" structure, being of conductive plastic, provides a greatly increased active material surface contact and electrical conduction effect, thereby obtaining a greatly improved active material effectiveness.

Whereas in FIG. 2 the electrode of the invention is illustrated to be of single plate-like form, it is to be understood that the electrode may be otherwise constructed. For example, in FIG. 1 two rectangular sections of this material as indicated at 18 may be applied to opposite sides of a nickel wire screen as indicated at 20 and imbedded thereon, in sandwich form, by the application of heat and pressure. The nickel wire screen is preferably provided with a nickel metal tab as indicated at 22 welded to one edge thereof for use in connecting the electrode to a battery terminal. The electrode plates as thus prepared are suitable for use as the positive electrodes in nickel-cadmium batteries which otherwise are of conventional design and composition. The negative electrode is formed in a similar manner except that the active material imbedded in a similar manner except that the active material imbedded therein will of course be a cadmium nitrate compounds.

I claim:
1. A method of fabricating a battery electrode comprising mixing together discrete particles of conductive plastic and formed electrode active material in the proportion of about 5–20% plastic to about 95–80% active material, and molding the mixture into a porous unitary form by application of heat and pressure sufficient to join adjacent plastic particles.

2. The method of making battery electrodes which comprises
   mixing particles of electrically conductive plastic with particles of active material in the proportion of about 5–20% plastc to about 95–80% active material,
   and joining the particles of plastic to entrap the active material and form voids throughout the mixture.

3. The method according to claim 2 wherein the particles of plastic are joined by softening the same with a suitable solvent and applying pressure to the mixture.

References Cited by the Examiner

UNITED STATES PATENTS

| | | | |
|---|---|---|---|
| 2,727,080 | 12/55 | Moulton | 136—24 |
| 2,737,541 | 3/56 | Coolidge | 136—20 |
| 2,738,375 | 3/56 | Schlotter | 136—30 |
| 2,811,572 | 10/57 | Fischbach et al. | 136—34 |
| 2,824,165 | 2/58 | Marsal | 136—122 |

JOHN H. MACK, *Primary Examiner.*

MURRAY TILLMAN, *Examiner.*

UNITED STATES PATENT OFFICE
CERTIFICATE OF CORRECTION

Patent No. 3,184,339

May 18, 196

Grenville B. Ellis

It is hereby certified that error appears in the above numbered patent requiring correction and that the said Letters Patent should read as corrected below.

Column 1, line 26, for "case" read -- ease --; column 3, line 2, for "are", first occurrence, read -- or --; line 8, after "material" insert --, the active material --; same column 3, line 11, for "cmpound" read -- compound --; column 4, lines 31 and 32, strike out "in a similar manner except that the active material imbedded".

Signed and sealed this 19th day of October 1965.

(SEAL)
Attest:

ERNEST W. SWIDER
Attesting Officer

EDWARD J. BRENNER
Commissioner of Patents